US012660740B2

(12) United States Patent
Zhang et al.

(10) Patent No.: US 12,660,740 B2
(45) Date of Patent: Jun. 23, 2026

(54) SEED-METERING DEVICE HAVING MULTIPLE CAVITIES AND MAGNETIC SEED PROTECTION ASSEMBLY

(71) Applicant: Anhui Agricultural University, Hefei City (CN)

(72) Inventors: Shun Zhang, Hefei City (CN); Fangyuan Wang, Hefei City (CN); Huyang Tang, Hefei (CN); Yu Wan, Hefei City (CN); Bo Zhou, Hefei City (CN); Jinwei Yan, Hefei City (CN); Chaoyang Zhang, Hefei City (CN); Fuming Kuang, Hefei City (CN); Wei Xiong, Hefei City (CN); Zhaodong Li, Hefei City (CN); Juan Liao, Hefei City (CN); Dequan Zhu, Hefei City (CN)

(73) Assignee: Anhui Agricultural University, Hefei City (CN)

( * ) Notice: Subject to any disclaimer, the term of this patent is extended or adjusted under 35 U.S.C. 154(b) by 361 days.

(21) Appl. No.: 18/388,382

(22) Filed: Nov. 9, 2023

(65) Prior Publication Data

US 2024/0188480 A1     Jun. 13, 2024

(30) Foreign Application Priority Data

Dec. 8, 2022     (CN) .......................... 202211575627.0

(51) Int. Cl.
 *A01C 7/04*     (2006.01)
 *A01C 7/10*     (2006.01)
(52) U.S. Cl.
 CPC .............. *A01C 7/046* (2013.01); *A01C 7/102* (2013.01)

(58) Field of Classification Search
 CPC .................... A01C 7/04–046; A01C 7/10–102
 (Continued)

(56) References Cited

U.S. PATENT DOCUMENTS

2014/0312055 A1* 10/2014 Rans et al. ............. A01C 19/02
                                                   221/258

FOREIGN PATENT DOCUMENTS

CN         105766157 A  *  7/2016  ............... A01C 7/20
CN         209358983 U  *  9/2019

OTHER PUBLICATIONS

Li et al., "Seed Plate And Device Using The Same" (CN 105766157 A), machine translation. (Year: 2016).*

(Continued)

*Primary Examiner* — Tara Mayo

(74) *Attorney, Agent, or Firm* — Downs Rachlin Martin PLLC

(57)     ABSTRACT

A cavity-type seed-metering device with a magnetic seed protection assembly is provided, which includes a seed-metering device shell, a seeding plate and a seeding shaft. The seeding plate rotatably mounted in the seed-metering device shell through the seeding shaft. A seeding channel is formed in the seed-metering device shell. Multiple cavities are formed in the seeding plate. Seed filling orifices connected with the cavities are formed in one side of the seeding plate. Seeding outlets connected with the cavities are formed in a circumferential surface of the seeding plate. A magnetic hinge is rotatably connected with the seeding outlet. A notched magnetic ring is fixed in the seed-metering device shell. The magnetic hinge can close the seeding outlet under a magnetic force of the notched magnetic ring. A magnetic block that can attract the magnetic hinge for opening the seeding outlets is arranged in the seeding channel.

8 Claims, 8 Drawing Sheets

502a/          \901

(58) Field of Classification Search
USPC ................................................. 111/170, 177
See application file for complete search history.

(56) References Cited

OTHER PUBLICATIONS

Liu et al., "A Magnetic Seeding" (CN 209358983 U), machine translation. (Year: 2019).*

* cited by examiner

502b 502a          901

SEED-METERING DEVICE HAVING MULTIPLE CAVITIES AND MAGNETIC SEED PROTECTION ASSEMBLY

CROSS-REFERENCE TO RELATED APPLICATION

This patent application claims the benefit and priority of Chinese Patent Application No. 202211575627.0, entitled "CAVITY-TYPE SEED-METERING DEVICE WITH MAGNETIC SEED PROTECTION ASSEMBLY" filed on Dec. 8, 2022, the disclosure of which is incorporated by reference herein in its entirety as part of the present application.

TECHNICAL FIELD

The present disclosure relates to the technical field of seed-metering devices, and specifically discloses seed-metering device having multiple cavities and a magnetic seed protection assembly.

BACKGROUND

The seed protection device of the existing mechanical seed-metering device mainly has various forms such as a fixed seed protection plate, a seed-metering shell, an elastic servo seed protection belt and a chute seed protection piece. The fixed seed protection plate or the seed-metering shell can rub and squeeze with the seeds during the seeding of the seed-metering device, resulting in damage to the seeds. The elastic servo seed protection belt may rotate synchronously with the seeding assembly to reduce relative sliding between the seeds and the seed protection belt. However, if the seeds are exposed from the holes containing the seeds, the extrusion damage may also be caused to the seeds. At the same time, the elastic belt is easy to fatigue, relax and age, so that the seed protection effect is affected, even the elastic belt cannot rotate synchronously with the seeding assembly, and the servo seed protection effect cannot be achieved. The chute seed protection piece rotates synchronously with the seeding component to protect the seeds, but the chute seed protection piece needs to move axially with the seeding component to achieve the opening and closing of the holes. The shearing damage can be caused to the seeds exposed outside the holes when the chute seed protection piece closes the holes, and the axial movement of the chute seed protection piece needs to be driven by the cylindrical cams on both sides, so that the seed protection piece is easy to rub and the overall structure is complex.

For example, the utility model patent with the application number of CN2008200899775 discloses a seed-metering device with a servo seed protection plate, including a shell and a seeding wheel mounted in the shell. A group of sockets are arranged on an outer circular surface of the seeding wheel. The seeding wheel is connected with a roller brush and a servo seed protection plate. The servo seed protection plate is provided with a servo wheel. The seeding wheel is connected with the roller brush through chains or gears, and connected with the servo seed protection plate through chains, gears or friction. The seed-metering device can protect the seeds from being damaged by friction by the constant velocity movement of the servo seed protection plate and the seeding wheel, but the seeds still can be squeezed and damaged when the seeds are exposed from the sockets. Based on the deficiencies of a variety of seed protection devices such as the fixed seed protection plate, the seed-metering shell, the elastic servo seed protection belt and the chute seed protection piece in the existing seed-metering device, the present disclosure provides a seed-metering device having multiple cavities and a magnetic seed protection assembly, and the seed-metering device having the multiple cavities can effectively solve the technical problems mentioned above.

SUMMARY

The embodiments aim to provide a seed-metering device having multiple cavities and a magnetic seed protection assembly so as to solve the deficiency of the seed protecting device of the existing mechanical seed-metering device in the background.

The present disclosure is realized through the following technical solution.

A seed-metering device having multiple cavities and a magnetic seed protection assembly includes a seed-metering device shell, a seeding plate and a seeding shaft, wherein the seeding plate is rotatably mounted in the seed-metering device shell through the seeding shaft, a seeding channel is formed in the seed-metering device shell, multiple cavities are formed in the seeding plate in a ring array, seed filling orifices are formed in one side, facing a seed feed pipe, of the seeding plate, each of the seed filling orifices is connected with a corresponding one of the multiple cavities, seeding outlets connected with the multiple cavities are formed in a circumferential surface of the seeding plate, each of the seeding outlets is connected with the corresponding one of the multiple cavities, a magnetic hinge for closing or opening a corresponding one of the seeding outlets is rotatably connected with the each of the seeding outlets, a notched magnetic ring is fixed in the seed-metering device shell, the magnetic hinge is able to close the corresponding one of the seeding outlets under a magnetic force of the notched magnetic ring, and a magnetic block that is able to attract the magnetic hinge for opening the seeding outlets is arranged in the seeding channel.

According to the present disclosure, the principle that opposite magnetic poles attract each other is utilized to rotate the magnetic hinges at the seeding outlets of the cavities of the seeding plate of the seed-metering device having the multiple cavities so as to open or close the seeding outlets. That is to say, when seed protection is needed, the magnetic hinge closes the seeding outlet under the action of a magnetic force of the notched magnetic ring to realize seed protection, and in the process of closing the seeding outlet for seed protection by the magnetic hinge, the magnetic hinge is free of relative extrusion and shear on seeds. When the seeding outlet needs to be opened, the magnetic force of the notched magnetic ring is weakened, and the magnetic hinge rotates to be opened quickly under the action of the own gravity and the magnetic block adsorption, so that the seeding is realized. After the seeding, the magnetic hinge rotates to be closed under the action of the own gravity and the magnetic ring attraction.

As a first specific solution of the above solution, the notched magnetic ring may be fixedly arranged on a side surface, away from the seed filling orifices, of the seed-metering device shell, a ring groove for extending into the notched magnetic ring may be formed on a side face of the seeding plate, and the notched magnetic ring may be not in contact with each wall of the ring groove.

As specific arrangement of the above solution, the magnetic hinge may include a hinge seat and a magnetic sheet, the magnetic sheet may be fixedly mounted on an outer surface of the hinge seat, a magnetism of an inner side of the magnetic sheet and a magnetism of an outer side of the notched magnetic ring may be opposite, and a magnetism of an outer side of the magnetic sheet and a magnetism of an outer side of the magnetic block may be opposite.

The above is a first specific design mode of the magnetic seed protection assembly in the seed-metering device having the multiple cavities, so that the magnetic hinge closes the seeding outlet of the seeding plate by utilizing the magnetic adsorption force between the magnetic hinge and the notched magnetic ring during the rotation of the seeding plate along with the seeding shaft, thereby achieving the seed protection function.

As a second specific solution of the above solution, the notched magnetic ring may be fixedly arranged on a circumferential inner wall of the seed-metering device shell, and an annular gap may be reserved between the notched magnetic ring and the seeding plate.

As specific arrangement of the above solution, the magnetic hinge may include a hinge seat and a magnetic sheet, the magnetic sheet may be fixedly mounted on an outer surface of the hinge seat, a magnetism of an outer side of the magnetic sheet and a magnetism of an inner side of the notched magnetic ring may be same, and a magnetism of an outer side of the magnetic sheet and a magnetism of an outer side of the magnetic block may be opposite.

The above is a second specific design mode of the magnetic seed protection assembly in the seed-metering device having the multiple cavities, so that the magnetic hinge closes the seeding outlet of the seeding plate by utilizing the magnetic repulsion force between the magnetic hinge and the notched magnetic ring during the rotation of the seeding plate along with the seeding shaft, thereby achieving the seed protection function.

As specific arrangement of the above solution, each of the multiple cavities may be U-shaped, the each of the seed filling orifices may be connected with one side wall of the corresponding one of the multiple cavities, and the each of the seeding outlets may be connected with an other end of the corresponding one of the multiple cavities.

As specific arrangement of the above solution, a pin shaft seat hole may be formed in one end of the each of the seeding outlets, and the magnetic hinge may be arranged at the each of the seeding outlets through connection between the pin shaft and the pin shaft seat hole.

As specific arrangement of the above solution, the seed-metering device having the multiple cavities may further include a seed spacer plate, the seed spacer plate may be fixedly connected with a periphery, close to end faces of the seed filling orifices, of the seeding plate, and an end face of the seed spacer plate may be flush with an end face, close to the seed filling orifices, of the seeding plate. The above design of the seed spacer plate can ensure that the seeds entering into the seed-metering device can be blocked on the side in which the seed filling orifices are formed, thereby ensuring that the seeds cannot enter into the seeding channel from other gaps and ensuring the accuracy of the seeding amount.

Compared with the prior art, the embodiments have the following beneficial effects.

Firstly, through the magnetic seed protection assembly, the seed-metering device having the multiple cavities and the magnetic seed protection assembly disclosed in the embodiments relies on the principle that opposite magnetic poles attract each other or same magnetic poles repel each other, so that the seed protection assembly, the seeds and the seed-metering device shell are free of friction effect to ensure that the seeds and the seed protection assembly are not worn.

Secondly, according to the seed-metering device having the multiple cavities and the magnetic seed protection assembly disclosed in the embodiments, the magnetic seed protection assembly and the seeding plate are rotatably hinged, so as to realize the seed protection and the seeding actions of opening and closing the seed protection assembly, and in combination with the cavity-type seeding rule, so as to ensure that the seeds are not squeezed and damaged.

BRIEF DESCRIPTION OF THE DRAWINGS

To describe the technical solutions in the embodiments of the present discourse more clearly, the following briefly describes the attached figures required for describing the embodiments. Apparently, the drawings in the following descriptions show merely some embodiments of the present disclosure, and a person of ordinary skill in the art may derive other drawings from these attached figures without creative efforts.

DETAILED DESCRIPTION OF THE EMBODIMENTS

To make a person skilled in the art understand the technical solutions in the present disclosure better, the following clearly and completely describes the technical solutions in the embodiments of the present disclosure with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

Figure 1:
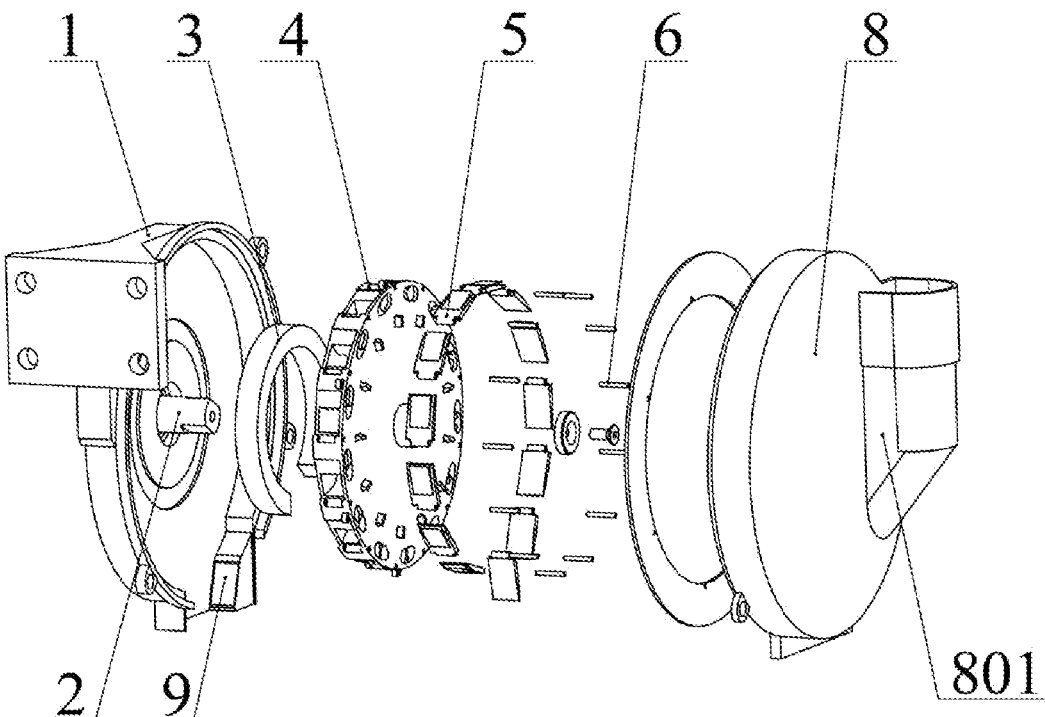
FIG. 1 is a three-dimensional explosion diagram of a seed-metering device having multiple cavities according to the present disclosure.
Figure 2:
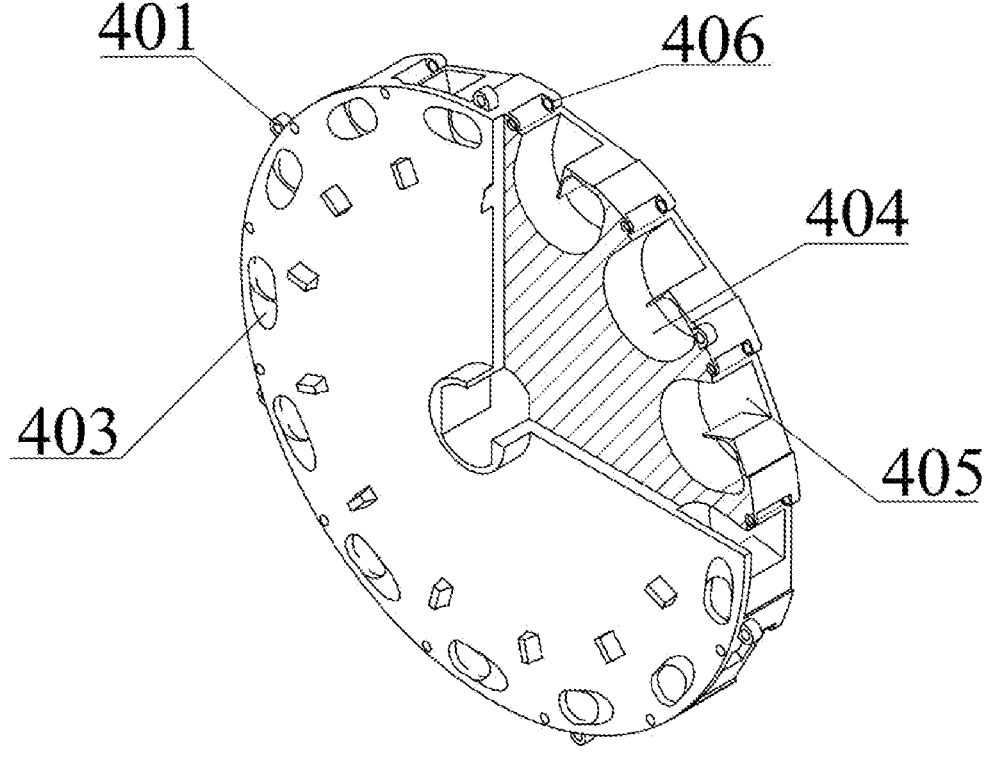
FIG. 2 is a partial sectional view of a seeding plate according to the present disclosure.
Figure 3:
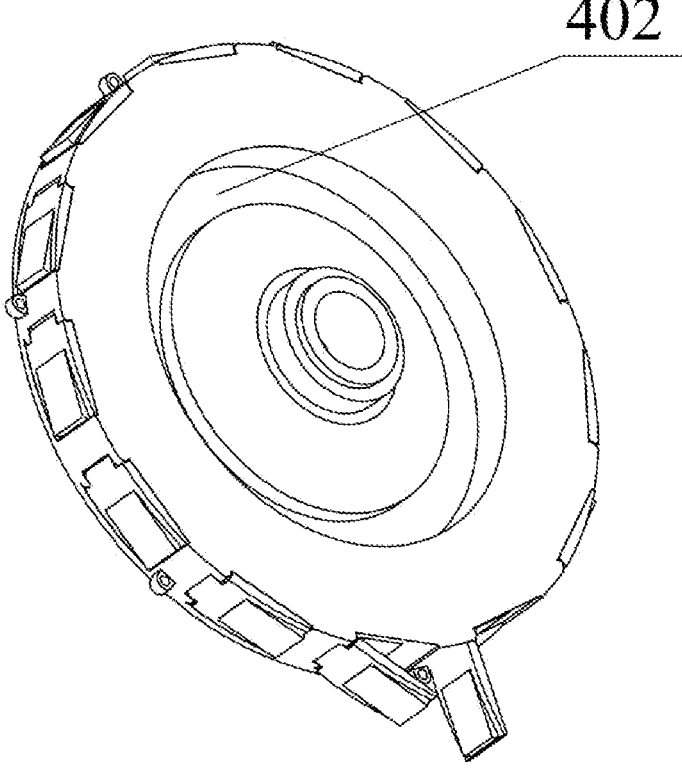
FIG. 3 is an assembly diagram of magnetic hinges and the seeding plate according to the present discourse.
Figure 4:
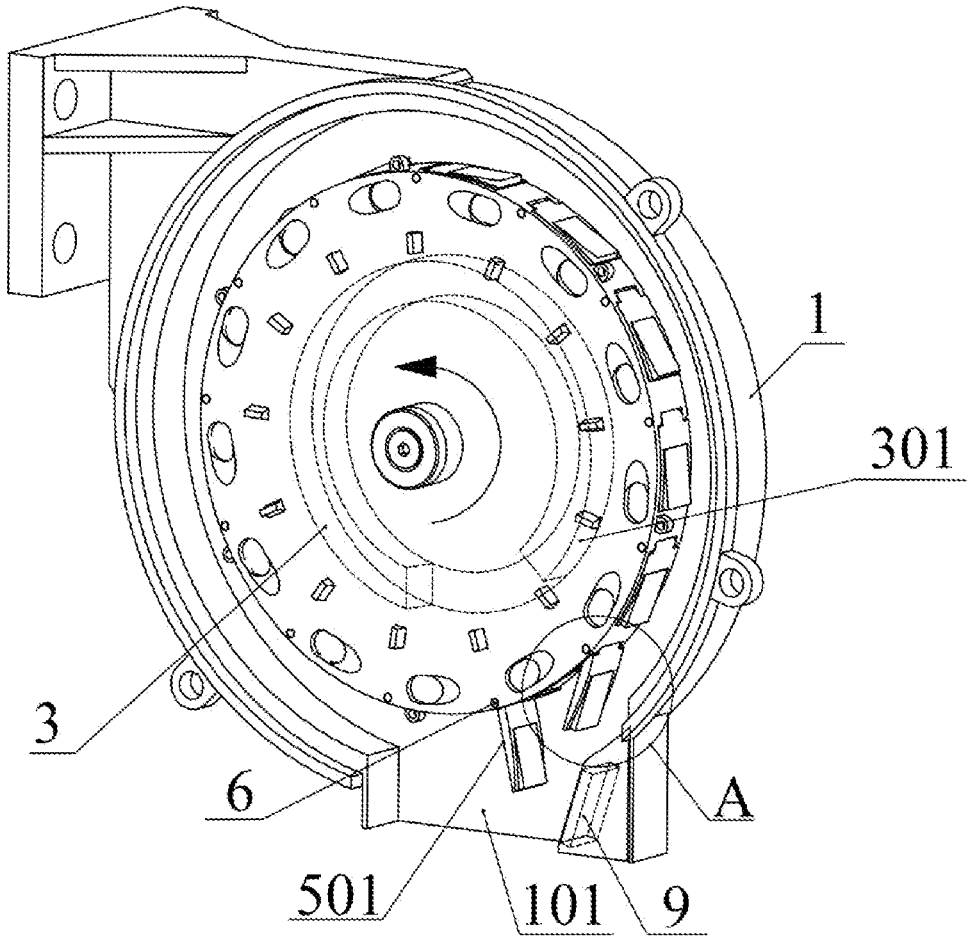
FIG. 4 is a first-angle structural schematic diagram of a magnetic ring and a magnetic block mounted inside the seed-metering device according to the first embodiment.
Figure 5:
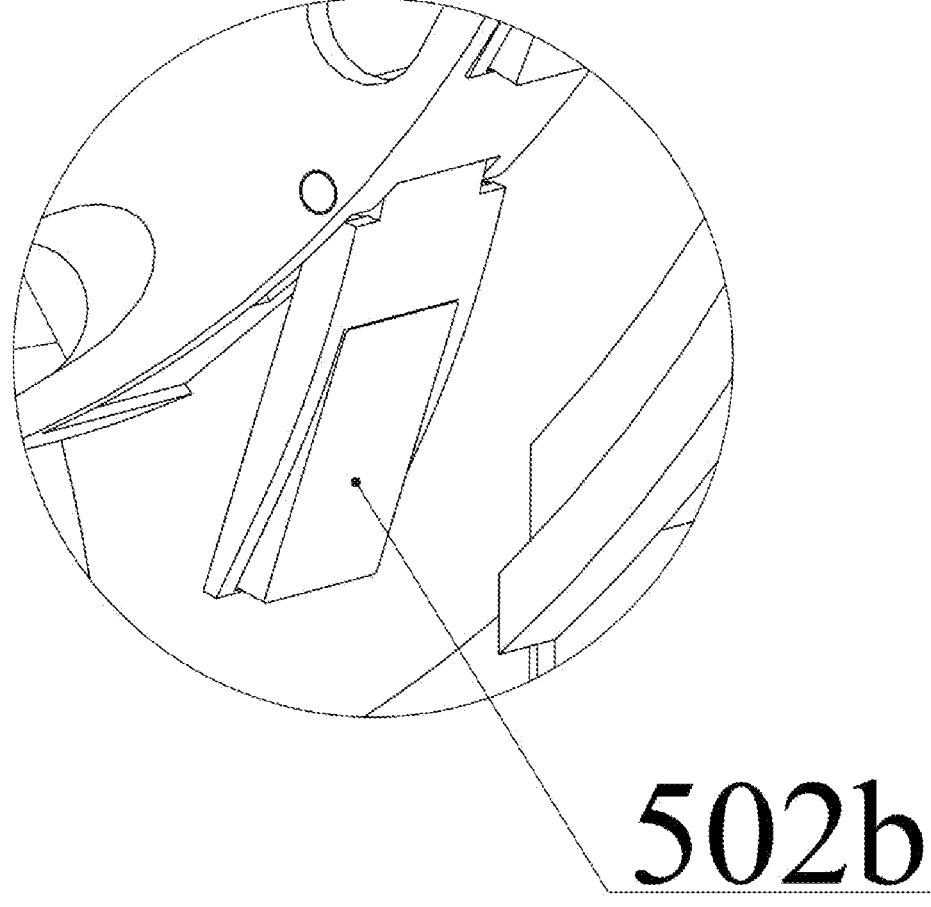
FIG. 5 is an amplified structural schematic diagram of part A in FIG. 4.
Figure 6:
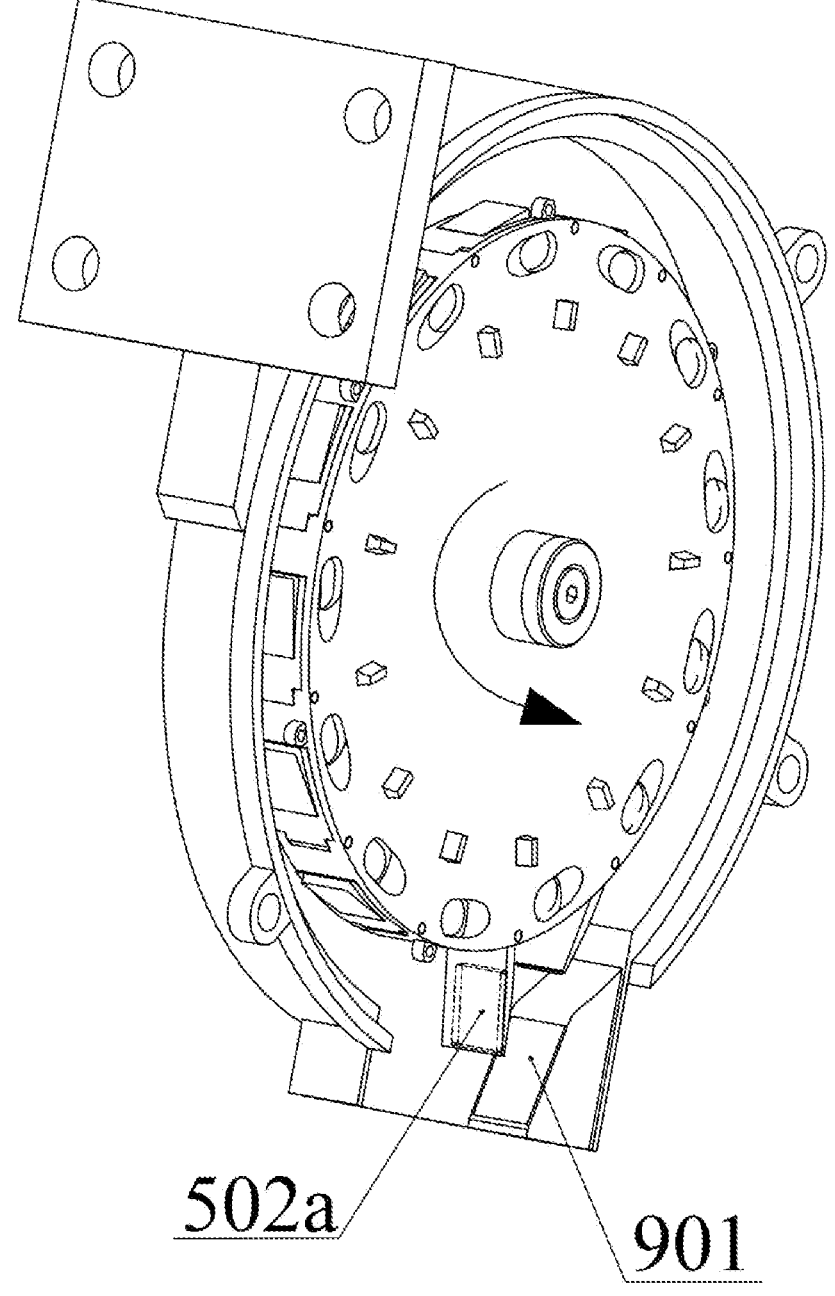
FIG. 6 is a second-angle structural schematic diagram of magnetic hinges and a magnetic block mounted inside the seed-metering device according to the first embodiment.
Figure 7:
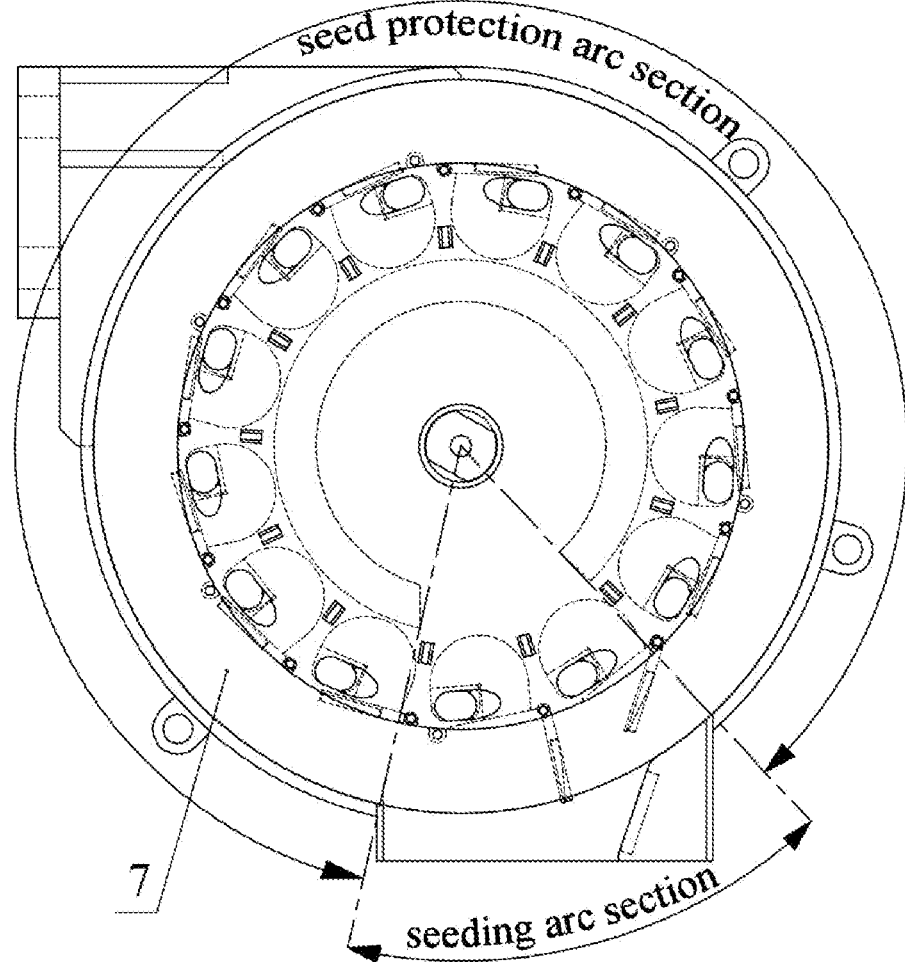
FIG. 7 is a schematic diagram of the positions of a seed protection arc section and a seeding arc section according to the first embodiment.
Figure 8:
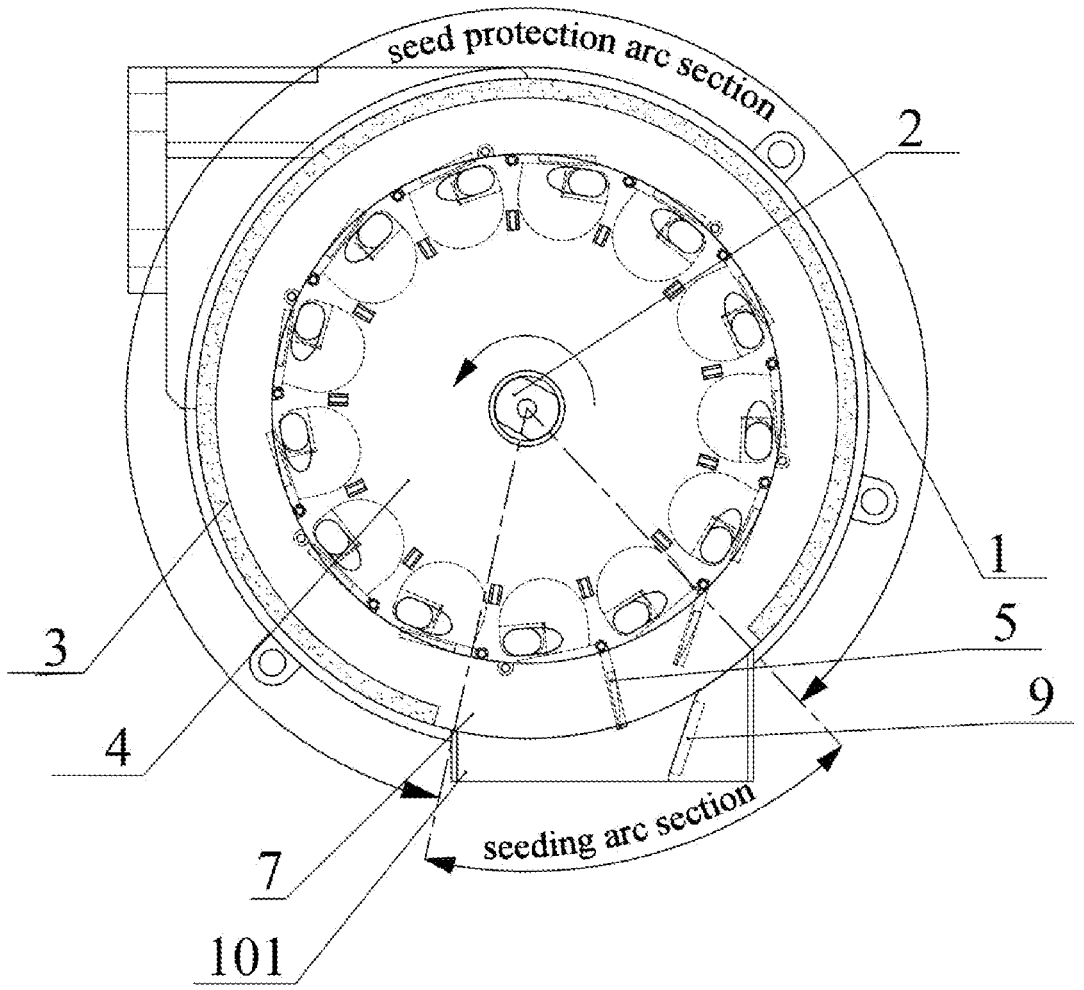
FIG. 8 is a schematic diagram of the positions of a seed protection arc section and a seeding arc section according to the second embodiment.

It needs to be illustrated that under the compatible condition, the embodiments in the present disclosure and the features in the embodiments can be combined with each other. The present disclosure will be described in detail below with reference to FIG. 1 to FIG. 8 in conjunction with the embodiments.

First Embodiment

The first embodiment discloses a seed-metering device having multiple cavities and a magnetic seed protection assembly. A main body of the seed-metering device includes a seed-metering device shell 1, a seeding shaft 2, a seeding plate 4 and a seed chamber shell 8. The seed-metering device shell 1 and an open end of the seed chamber shell 8 are connected by screws to form a seed-metering device outer shell. A seeding channel 101 is formed in a lower end of the seed-metering device shell 1. A seed feed pipe 801 is arranged on the seed chamber shell 8. The seeding plate 4 is arranged in the seed-metering device outer shell and connected with the seeding shaft 2 at the position of a circle center of the seeding plate 4, so that the seeding plate 4 can rotate synchronously with the seeding shaft 2 in the seed-metering device outer shell under the action of the seeding shaft 2.

Multiple U-shaped cavities 404 are formed in the seeding plate 4 in a ring-like array, and seed filling orifices 403 connected with the U-shaped cavities 404 are formed in a side face, facing the seed chamber shell 8, of the seeding plate 4. Multiple seeding outlets 405 are formed in a circumferential surface of the seeding plate 4 in a ring array, and the seeding outlets 405 are connected with the corresponding U-shaped cavities 404 one by one, so that seeds introduced from the seed feed pipe 801 enter a gap between the seed chamber shell 8 and the seeding plate 4, and enter the interiors of the U-shaped cavities 404 through the seed filling orifices 403 during the rotation of the seeding plate 4 along with the seeding shaft 2. The seeds in the U-shaped cavities 404 can be discharged from the seeding outlets 405 after the seeding plate 4 rotates at a certain angle. In addition, in order to ensure that the seeds in the seed chamber shell 8 are always in the gap between the seed chamber shell 8 and the seeding plate 4, a seed spacer plate 7 is further arranged on a side surface, in which the seed filling orifices 403 are formed, of the seeding plate 4. In specific arrangement, multiple lugs 401 are uniformly arranged on the circumferential surface one side, near the seeding outlets 405, of the seeding plate 4. A threaded hole is formed in each lug, and the seed spacer plate 7 is threadedly connected with connecting screws corresponding to the lugs 401. The seed spacer plate 7 can be fastened and mounted on the seeding plate 4 through the matching action between the connecting screws and the threaded holes, and an end face of the seed spacer plate 7 is flush with an end face of the seed filling side of the seeding plate 4. The seeds can be blocked in the seed chamber shell 8 through the seed spacer plate.

A magnetic seed protection assembly is arranged inside the seed-metering device outer shell and on the seeding plate 4. The magnetic seed protection assembly includes a notched magnetic ring 3, one side of the notched magnetic ring 3 is fixed on a side wall of the seed-metering device shell 1, and a notch of the notched magnetic ring 3 is arranged facing the seeding channel 101. At the same time, a ring-like groove 402 is formed in a side surface, facing the seed-metering device shell 1, of the seeding plate 4. The other side of the notched magnetic ring 3 extends into the ring groove 402. When being arranged, it should be noted that the notched magnetic ring 3 does not be in contact with each wall of the ring-like groove 402, so as to ensure that the seeding plate 4 cannot be worn by any friction with the notched magnetic ring 3 during rotation with the seeding shaft 2. A magnetic block 9 is fixedly mounted on a right side wall of the seeding channel 101, so that during the counterclockwise rotation of the seeding plate 4, the seeding outlets 405 in the seeding plate 4 gradually move close to the magnetic block 9.

The magnetic seed protection assembly further includes a magnetic hinge 5 rotatably connected at each of the seeding outlets 405. The magnetic hinge 5 includes a hinge seat 501 and a magnetic sheet 502. A pin shaft seat hole 406 is formed in an end of each of the seeding outlets 405. The hinge seat 501 is rotatably connected to the pin shaft seat hole 406 through a pin 6, so that the hinge seat 501 and the seeding outlet 405 in the seeding plate 4 can be seamlessly attached to close the seeding outlet 405 or open the seeding outlet 405 in the seeding plate 4 away from the seeding outlet 405, and the magnetic sheet 502 is fastened and mounted in a square groove in an outer surface of the hinge seat 501. It should be noted that the magnetism of the inner side 502a of the magnetic sheet 502 and the magnetism of the outer side 301 of the notched magnetic ring 3 are opposite, and the magnetism of the outer side 502b of the magnetic sheet 502 and the magnetism of the outer side 901 of the magnetic block 9 are also opposite.

Finally, it should be noted that the seed-metering device shell 1, the seeding plate 4, the hinge seat 501, the pin shaft 6, the seed spacer plate 7 and the seed chamber shell 8 in the first embodiment should be made of materials that do not interact with magnetic poles, such as cast aluminum and plastics.

The specific working principle and the seed protection principle of the seed-metering device having the multiple cavities in the first embodiment are as follows.

Firstly, the seeds are loaded into the seed chamber shell 8 through the seed feed pipe 801, and the seeds are limited in the space between the seed chamber shell 8 and the seeding plate 4 under the action of the seed spacer plate 7. During the rotation of the seeding plate 4 along with the seeding shaft 2, the seeds enter into the U-shaped cavity 404 through the seed filling orifice 403, and the U-shaped cavity 404 is located in the seed protection arc section (namely, the central angle area corresponding to the notched magnetic ring 3). Due to the magnetic attraction between the magnetic hinge 5 and the notched magnetic ring 3 and the gravity of the magnetic hinge 5, the magnetic hinge 5 can be firmly attached to the seeding outlet 405 to be closed, thus achieving the seed protection effect.

When the magnetic hinge 5 is transferred into the seeding arc section (namely, the central angle area corresponding to the seeding channel 101), the magnetic attraction of the notched magnetic ring 3 to the magnetic hinge 5 is weakened to disappear, and the magnetic hinge 5 rotates around the pin shaft 6 to open the seeding outlet 405 of the seeding plate 4 under the action of own gravity and the suction of the magnetic block 9. The seeds in the U-shaped cavity 404 are discharged. The magnetic hinge 5 is transferred into the seed protection arc section again, and the seeding outlet 405 in the seeding plate 4 is closed again by the magnetic force to fill the seeds again and repeat the above actions.

Through the magnetic seed protection assembly designed above, the seed-metering device having the multiple cavities and the magnetic seed protection assembly disclosed in the first embodiment relies on the principle that opposite magnetic poles attract each other, so that the seed protection assembly, the seeds and the seed-metering device shell are free of friction effect to ensure that the seeds and the seed protection assembly are not worn. Moreover, the magnetic seed protection assembly and the seeding plate are rotatably hinged, so as to realize the seed protection and seeding actions of turning on and off the seed protection assembly, and in combination with the cavity-type seeding rule, so as to ensure that the seeds are not squeezed and damaged.

Second Embodiment

The second embodiment discloses a seed-metering device having multiple cavities and a magnetic seed protection assembly. Similarities with the first embodiment are not explained again, but the differences are the position and polarity design of the notched magnetic ring 3 in the magnetic seed protection assembly.

The notched magnetic ring 3 in the second embodiment is fixedly mounted on a circumferential inner wall of the seed-metering device shell 1, and a certain annular gap is reserved between an inner ring of the notched magnetic ring 3 and an outer circular surface of the seeding plate 4, so that the seeding plate 4 does not make contact with an inner wall of the notched magnetic ring 3 during the rotation of the seeding plate 4. At the same time, the notch of the notched magnetic ring 3 is arranged facing the seeding channel 101, so that the central angle area corresponding to the notched magnetic ring 3 is a seed protection arc section, and the central angle area corresponding to the seeding channel 101 is a seeding arc section.

It should be noted that the magnetism of the inner side of the notched magnetic ring 3 in the second embodiment is the same as that of the outer side 502*b* of the magnetic sheet 502, so that the inner side of the notched magnetic ring 3 and the outer side 502*b* of the magnetic sheet 502 repel each other and the magnetic hinge 5 is firmly attached to the seeding outlet 405 to be closed, thereby achieving the seed protection effect. The magnetism of the outer side 502*b* of the magnetic sheet 502 and the magnetism of the outer side 901 of the magnetic block 9 are opposite, so that the outer side 502*b* of the magnetic sheet 502 and the outer side 901 of the magnetic block 9 attract each other, and the magnetic hinge 5 can open the seeding outlet 405 for seeding under the action of own gravity and the suction of the magnetic block 9.

The foregoing descriptions are merely exemplary embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A seed-metering device having a plurality of cavities and a magnetic seed protection assembly, comprising a seed-metering device shell, a seeding plate and a seeding shaft, wherein the seeding plate is rotatably mounted in the seed-metering device shell through the seeding shaft, a seeding channel is formed in the seed-metering device shell, the plurality of cavities are formed in the seeding plate in a ring array, seed filling orifices are formed in one side, facing a seed feed pipe, of the seeding plate, each of the seed filling orifices is connected with a corresponding one of the plurality of cavities, seeding outlets connected with the plurality of cavities are formed in a circumferential surface of the seeding plate, each of the seeding outlets is connected with the corresponding one of the plurality of cavities, a magnetic hinge for closing or opening a corresponding one of the seeding outlets is rotatably connected with the each of the seeding outlets, a notched magnetic ring is fixed in the seed-metering device shell, the magnetic hinge is able to close the corresponding one of the seeding outlets under a magnetic force of the notched magnetic ring, and a magnetic block that is able to attract the magnetic hinge for opening the seeding outlets is arranged in the seeding channel.

2. The seed-metering device having a plurality of cavities and a magnetic seed protection assembly according to claim 1, wherein the notched magnetic ring is fixedly arranged on a side surface, away from the seed filling orifices, of the seed-metering device shell, a ring groove for extending into the notched magnetic ring is formed on a side face of the seeding plate, and the notched magnetic ring is not in contact with each wall of the ring groove.

3. The seed-metering device having a plurality of cavities and a magnetic seed protection assembly according to claim 2, wherein the magnetic hinge comprises a hinge seat and a magnetic sheet, the magnetic sheet is fixedly mounted on an outer surface of the hinge seat, a magnetism of an inner side of the magnetic sheet and a magnetism of an outer side of the notched magnetic ring are opposite, and a magnetism of an outer side of the magnetic sheet and a magnetism of an outer side of the magnetic block are opposite.

4. The seed-metering device having a plurality of cavities and a magnetic seed protection assembly according to claim 1, wherein the notched magnetic ring is fixedly arranged on a circumferential inner wall of the seed-metering device shell, and an annular gap is reserved between the notched magnetic ring and the seeding plate.

5. The seed-metering device having a plurality of cavities and a magnetic seed protection assembly according to claim 4, wherein the magnetic hinge comprises a hinge seat and a magnetic sheet, the magnetic sheet is fixedly mounted on an outer surface of the hinge seat, a magnetism of an outer side of the magnetic sheet and a magnetism of an inner side of the notched magnetic ring are same, and a magnetism of an outer side of the magnetic sheet and a magnetism of an outer side of the magnetic block are opposite.

6. The seed-metering device having a plurality of cavities and a magnetic seed protection assembly according to claim 1, wherein each of the plurality of cavities is U-shaped, the each of the seed filling orifices is connected with one side wall of the corresponding one of the plurality of cavities, and the each of the seeding outlets is connected with an other end of the corresponding one of the plurality of cavities.

7. The seed-metering device having a plurality of cavities and a magnetic seed protection assembly according to claim 1, wherein a pin shaft seat hole is formed in one end of the each of the seeding outlets, and the magnetic hinge is arranged at the each of the seeding outlets through connection between the pin shaft and the pin shaft seat hole.

8. The seed-metering device having a plurality of cavities and a magnetic seed protection assembly according to claim 1, further comprising a seed spacer plate, the seed spacer plate is fixedly connected with a periphery, close to end faces of the seed filling orifices, of the seeding plate, and an end face of the seed spacer plate is flush with an end face, close to the seed filling orifices, of the seeding plate.

\* \* \* \* \*